July 2, 1929.　　　　V. DUTKIEWICZ　　　　1,719,758
TRANSPORTER
Filed Aug. 13, 1926　　　　4 Sheets-Sheet 1

Inventor:
V. Dutkiewicz,

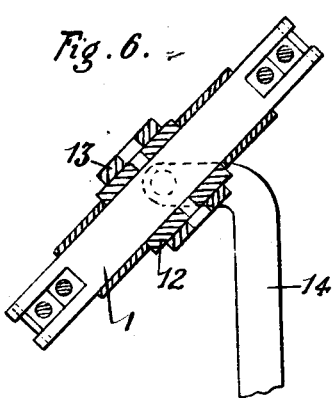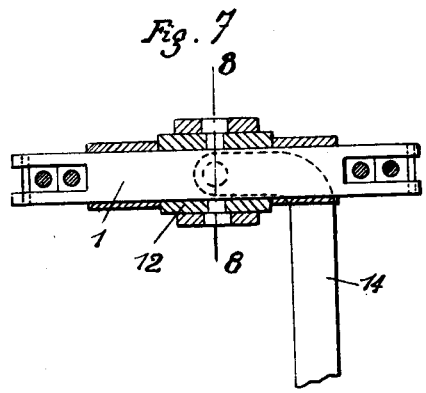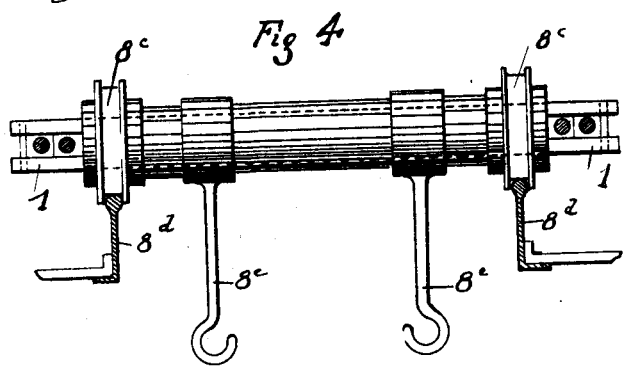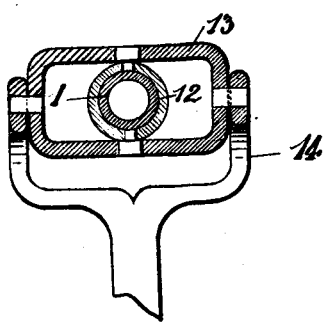

July 2, 1929.　　　V. DUTKIEWICZ　　　1,719,758
TRANSPORTER
Filed Aug. 13, 1926　　　4 Sheets-Sheet 3

Inventor:
V. Dutkiewicz,
by Langner Perry Card & Langner
Atty.

Patented July 2, 1929.

1,719,758

UNITED STATES PATENT OFFICE.

VALENTIN DUTKIEWICZ, OF PARIS, FRANCE.

TRANSPORTER.

Application filed August 13, 1926, Serial No. 129,057, and in France March 9, 1926.

The present invention relates to transmission systems in which two or more parallel flexible members are connected together at intervals by cross-ties which engage with notched wheels.

According to this invention, the said connecting cross-ties are utilized as supporting or carrying members for the elements of a transporter.

By reason of the lightness of a transmission of the type employed, the transporter can be very widely developed. Moreover, this transmission lends itself to changes of direction in the three dimensions of space, which fact is of great value in its application to transporting devices.

For example, if the flight of cables is arranged in a vertical plane for a certain part of their travel, the connecting ties then coming into engagement with horizontal wheels, if it is desired to change the level or to incline the transmission cables, it is only necessary to bring the flight into a horizontal position by twisting it and to engage the cross-ties with the notches of a vertical wheel.

As a result, however, the cross-ties, which were originally vertical, now assume the horizontal position. Consequently it is usually necessary to adopt special means in order that the transporter elements shall not participate in the oscillatory movements of the cross-ties when the latter are utilized for supporting or carrying these elements, according to the present invention.

The annexed drawings represent by way of examples suitable forms of construction of a transporter according to the invention.

Figure 4 is a front view of one element of a transporter in which the flight of cables is horizontal.

Figures 5 to 7 are partial elevations, relating to a pivoted suspension fitted to a connecting cross-tie.

Figure 8 is a view in cross section on the line 8—8 of Figure 7.

Figure 9 is an elevation of one of the furnace heads.

Figure 10 is a corresponding plan.

Figure 11 is a transverse section of Figure 10 upon the plane 11—11 and on a larger scale.

Figure 1:
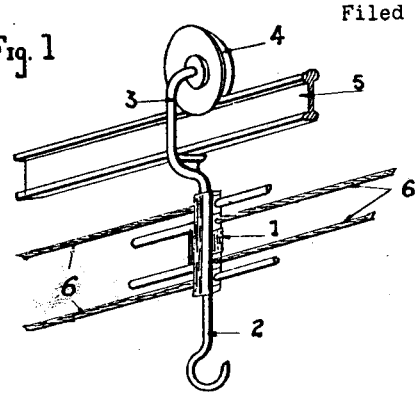
Figure 1 shows in perspective one of the elements of an overhead monorail transporter.
Figure 5:
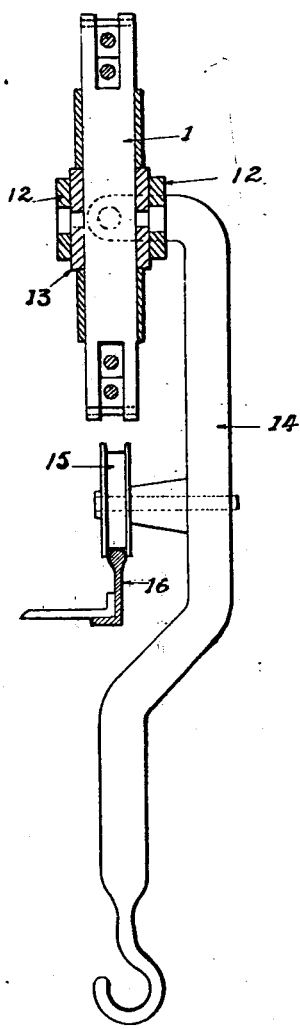

According to Figure 1, each connecting member or cross tie 1, carries at its base a hook 2, and at the top a cranked arm 3 terminating in a horizontal journal for a flanged wheel 4, which runs upon an overhead rail 5.

Each member 1 is connected to the adjacent ones in front and rear by cable lengths 6 secured to the member 1 by any suitable means.

Figure 2:
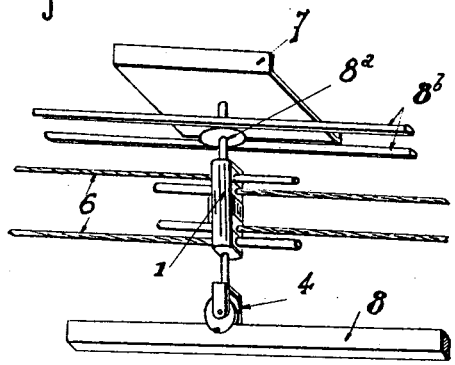
Figure 2 is a similar view of a transporter running upon a bottom rail.

According to Figure 2, each connecting member or cross-tie 1 is surmounted by a tray or plate 7 and provided at its base with a pivotal fork for a flanged roller 4 running upon a bottom rail 8. A roller $8^a$, mounted freely upon the upper extension of the member 1, travels between two guides $8^b$ which maintain the tray in horizontal position. This arrangement is especially applicable to continuous furnaces, stoves and drying apparatus.

Figure 3:
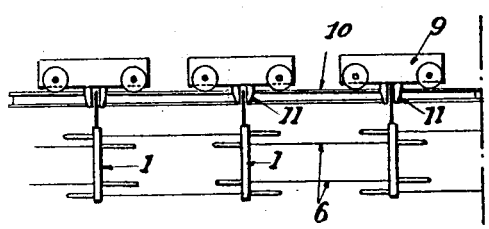
Figure 3 represents diagrammatically and in part longitudinal elevation a transporter of the truck type.

In Figure 3, the transporter is formed by a line of trucks 9, running upon an elevated rail 10. Each of these trucks is driven by one of the connecting ties 1, the extended upper end of which enters a socket 11 fitted to the bottom of the platform of each truck.

According to Figure 4, the connecting members are arranged horizontally. Rollers $8^c$, rotatably mounted on the cross-ties, run upon rails $8^d$. Each member 1 carries suitable means such as hooks $8^e$ from which the load is suspended.

The pivotal suspension device to which Figures 5 to 8 refer, is more especially intended for use in transporters involving changes of level or inclination.

In this device, a ring 12 is mounted loosely about the middle of the connecting member or cross tie 1. This ring carries two diametrically opposite trunnions upon which a small frame 13 is pivoted. This frame is also provided with two trunnions alined in a direction perpendicular to the axis of the trunnions for the ring 12. Upon the trunnions of the frame 13 there is pivoted a forked member 14 having its arms cranked at right angles, its stem carrying a roller 15 adapted to run upon a suspended rail 16. The stem of the fork 14 also forms at its lower end a hook or ring which serves, for example, for the suspension of a pan or vessel, the center of gravity of the whole when empty being at or preferably below the level of the head of the rail 16.

As a result of this arrangement, the stem of the fork 14 remains constantly vertical, whatever be the position assumed by the connecting member 1 during the changes of level or of inclination, and oscillations of the suspended pan or the like are avoided.

Figure 9:
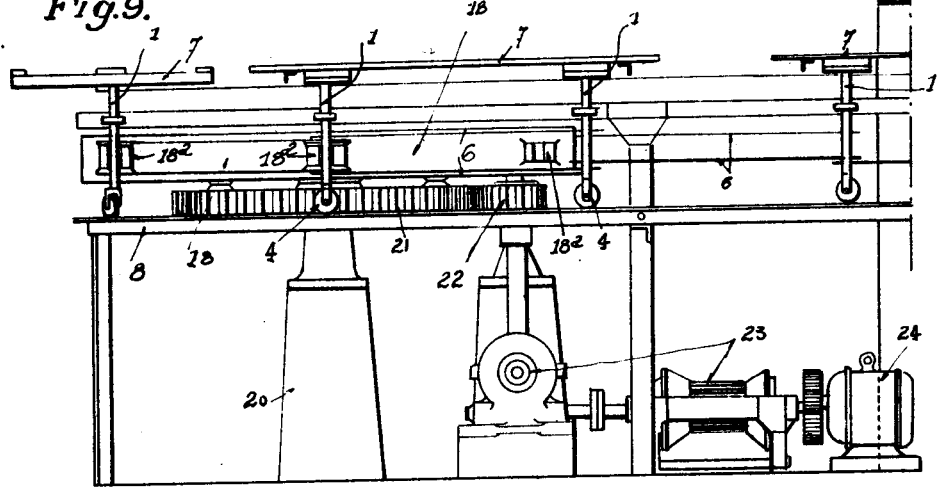
Figures 9 to 11 show the application to a continuous furnace of a device similar to that of Figure 2.
Figure 10:
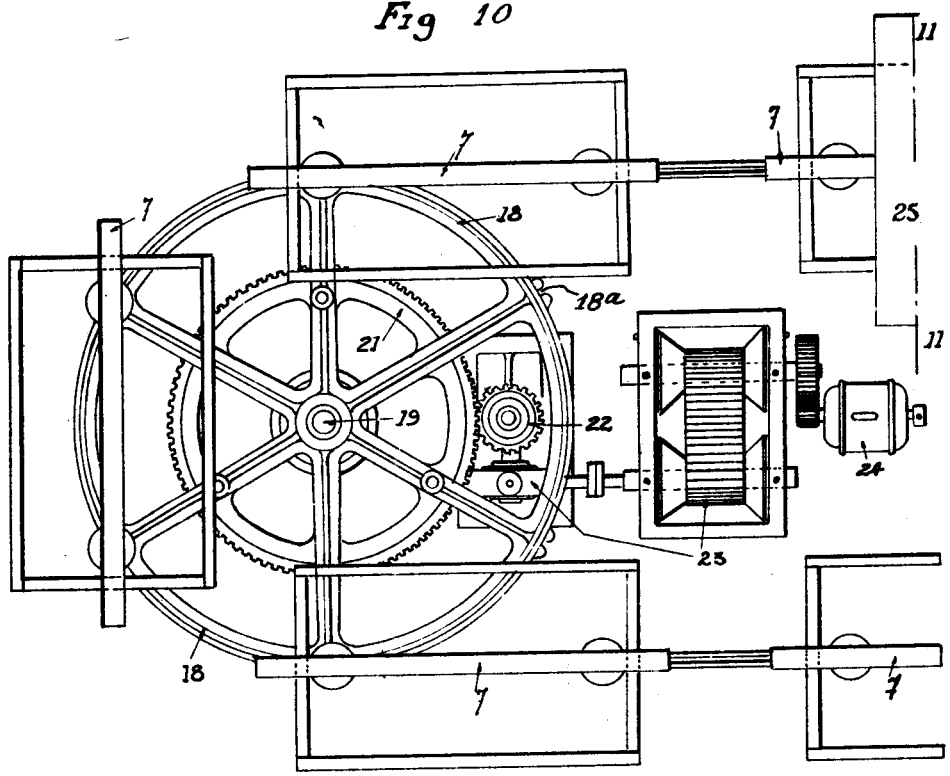
Figure 11:
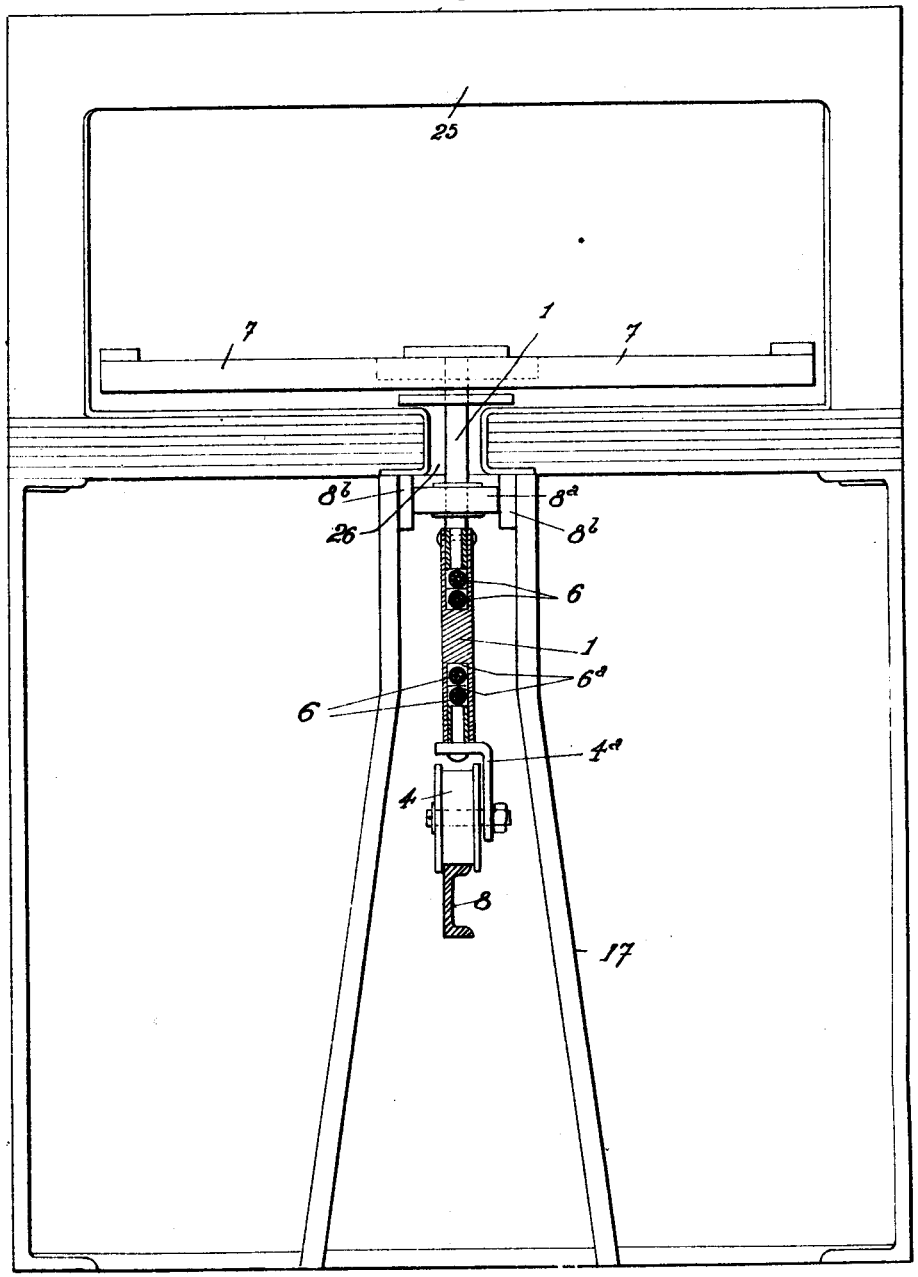

In the application illustrated in Figures 9 to 11, the transporter is formed by a series of elements 7, each carried by two cylindrical pins or rods 1 located at the middle of its width and near its ends. At the base of each rod 1 there is attached by a vertical pivot the supporting arm or cheek-piece 4ª (see Fig. 11) of a roller 4 mounted upon a horizontal journal. The rollers 4 of all the elements run upon one of the flanges of a channel beam 8, which is carried by a framing 17 and extends over the entire closed path of the elements. These same rollers are provided with flanges to prevent them becoming derailed and ensure their turning to follow the track at curves.

Near its upper end, each rod 1 carries a roller 8ª mounted loosely upon it. This roller runs between two guide bars 8ᵇ fixed to the framing 17, like the rail 8, and following the circuit of the latter.

The rods 1 are spaced uniformly along the rail 8, each being attached to the next one by two or more superposed lengths of cable 6. The spacing apart of the cables varies from one pair of supporting rods to the next, in such a way that the successive lengths which meet at each support have their ends placed side by side. Each of the cable lengths extends beyond the support to which it is connected, and it is secured only on the far side of the axis of the support to a connecting member 6ª fitted to this support.

The supporting rods 1 engage with notches 18ª provided for the purpose upon the rim of the wheel 18 revolving upon the vertical shaft 19 carried by a frame 20. The wheel 18, around which the change of direction of the transporter takes place, is fast with a toothed wheel 21, meshing with a pinion 22 keyed upon the final shaft of a speed reducing gear 23 driven by a motor 24. The other head of the transporter comprises a second wheel similar to 18.

Between the two wheels, one of the lines of elements 7 passes through the tunnel furnace 25 in the bottom or sole of which there is formed a longitudinal slot 26 for the passage of the supporting rods 1. The difficulties generally encountered in preventing leakage in tunnel furnaces are thus reduced.

It will be understood that the invention is not limited to the forms or the details of construction described and illustrated, but that modifications may be introduced within the scope of the appended claims.

What I claim is:

1. In a transporter, a plurality of parallel flexible cables, transverse members connecting said cables at intervals, notched wheels with which said transverse members engage, transporting elements connected to said transverse members, and rollers carried by said transverse members and an elevated railway on which said rollers roll.

2. In a transporter, a plurality of parallel flexible cables, transverse members connecting said cables at intervals, notched wheels with which the said transverse members engage, transporting elements connected to said transverse members, rollers carried by said transverse members and a bottom railway upon which said rollers roll.

3. In a transporter, a plurality of parallel flexible cables, transverse members connecting said cables at intervals, notched wheels with which the said transverse members engage, transporting elements connected to said transverse members, rollers guided by said transverse members, a railway upon which said rollers roll, a roller freely mounted on each connecting member and two parallel rails between which the said roller rotates.

4. In a transporter, a plurality of parallel flexible cables, transverse members connecting said cables at intervals, notched wheels with which the said transverse members engage, transporting elements and jointed means for connecting said elements to said transverse connecting member.

5. In a transporter, a plurality of parallel flexible cables, transverse pieces connecting the said cables at intervals, notched wheels with which the said transverse pieces mesh, transporting elements, and means jointed in a plurality of directions for connecting said elements to said connecting pieces.

In testimony whereof I have signed my name to this specification.

VALENTIN DUTKIEWICZ.